(12) United States Patent
Nock et al.

(10) Patent No.: US 7,013,987 B2
(45) Date of Patent: Mar. 21, 2006

(54) CLUTCH ASSEMBLY AND CLAMP MECHANISM FOR ROTARY TOOL DISC

(75) Inventors: Stefan Nock, Reisterstown, MD (US); Michael L. O'Banion, Westminster, MD (US)

(73) Assignee: Black & Decker, Newark, DE (US)

( * ) Notice: Subject to any disclaimer, the term of this patent is extended or adjusted under 35 U.S.C. 154(b) by 280 days.

(21) Appl. No.: 09/948,477

(22) Filed: Sep. 7, 2001

(65) Prior Publication Data
US 2002/0030328 A1 Mar. 14, 2002

Related U.S. Application Data

(60) Provisional application No. 60/231,353, filed on Sep. 8, 2000.

(51) Int. Cl.
*B27C 9/02* (2006.01)

(52) U.S. Cl. .................. 173/213; 173/46; 173/171; 173/132; 83/665; 83/666

(58) Field of Classification Search ............... 83/665, 83/666, 676; 279/8, 141, 7; 173/217, 46, 173/171, 132, 213; 192/70.23, 70.24
See application file for complete search history.

(56) References Cited

U.S. PATENT DOCUMENTS

| | | | | |
|---|---|---|---|---|
| 4,513,633 A | * | 4/1985 | Goscenski, Jr. | 74/650 |
| 4,547,997 A | * | 10/1985 | Kimmelaar et al. | 451/342 |
| 4,550,817 A | * | 11/1985 | Euler | 192/70.23 |
| 4,779,382 A | * | 10/1988 | Rudolf et al. | 51/168 |
| 4,989,374 A | * | 2/1991 | Rudolf et al. | 451/342 |
| 5,058,909 A | * | 10/1991 | Rudolf et al. | 279/8 |
| 5,157,873 A | * | 10/1992 | Rudolf et al. | 451/342 |
| 5,545,078 A | * | 8/1996 | Schulz et al. | 451/342 |
| 5,601,483 A | * | 2/1997 | Rudolf et al. | 451/359 |
| 5,810,533 A | * | 9/1998 | Nakamura | 411/432 |
| 6,295,910 B1 | * | 10/2001 | Childs et al. | 83/698.11 |
| 6,439,091 B1 | * | 8/2002 | Dibbern et al. | 85/543 |

* cited by examiner

*Primary Examiner*—Scott A. Smith
*Assistant Examiner*—Gloria R. Weeks
(74) *Attorney, Agent, or Firm*—Michael P. Leary; Charles E. Yocum; Adan Ayala

(57) ABSTRACT

As system for clamping an rotary tool accessory disc or blade to an output shaft of a rotary tool comprising a cam clamping mechanism and a clutch assembly wherein the cam clamping mechanism comprises: a head element threadably engageable with the output shaft at a location axially outward of the accessory disc; a cam rotatably connected to the head element and rotatable between a clamped and unclamped position, wherein the clamped position the cam exerts a compression force axially inward against the accessory disc or blade; and wherein the clutch assembly comprises: at least one first type of disc located coaxially on and keyed to the output shaft; at least one second type of disc located coaxially on the output shaft and in planar parallel contact with the first type disc; and an inner washer having an internal bore, the inner washer located coaxially on the output shaft, axially outward of and surrounding the first type disc and the second type disc, the inner washer keyed at the internal bore to the second type of disc such that rotation of the second type of disc imparts rotation to the inner washer.

3 Claims, 6 Drawing Sheets

CLUTCH ASSEMBLY AND CLAMP MECHANISM FOR ROTARY TOOL DISC

CROSS REFERENCE TO RELATED APPLICATIONS

This application claims the 35 USC 119(e) benefit of prior U.S. provisional application No. 60/231,353 filed on Sep. 8, 2000.

BACKGROUND OF THE INVENTION

1. Field of the Invention

The present invention relates generally to the field of rotary power tools. In particular the present invention relates to a tool-free mechanism for gripping interchangeable rotary tool accessories, such as circular saw blades and grinding wheels.

2. Discussion

Various types of rotary power tools require a user to selectively attach a tool accessory, such as a circular saw blade or grinding wheel. Over the course of a particular project or work period it may be necessary to employ a variety of such accessories and to replace worn or broken ones. Convenient removal and replacement of the interchangeable tool accessories is therefore desirable.

Various methods are employed for gripping such accessory discs. For example, in current circular saw designs a blade has a center hole. The hole may be circular or a shape with sides and corners. A diamond shaped hole is well known for some applications. The hole in the blade fits over the end of the saw's output shaft or an extension thereof, with the plane of the blade transverse to the axis of the shaft. For some radial distance the axially inward facing surface of the blade rests against a flat shoulder of the shaft or an inner washer connected to the shaft.

Conventionally, the blade is clamped in place against the shoulder or inner washer with a retaining-nut threaded down over a threaded end of the drive spindle. An outer washer may be placed between the nut and the blade. When changing blades, the nut must be loosened and removed. The tightening and loosening of the nut may be partially performed by hand, but the size and shape of the nut make it difficult and/or uncomfortable to properly tighten and then initially loosen using hands alone. Therefore, it is necessary to use a hand wrench or similar tool in order to apply sufficient torque to the retaining nut.

Additionally, when tightening or loosening the nut, the shaft/spindle must be prevented from rotating or else it would be difficult to achieve relative motion between the nut and the rotatable spindle. Formerly, the loosening and tightening process required that the operator simultaneously grip both the shaft/spindle and the nut with two separate hand wrenches or the like. Then a torque was applied to the nut while the shaft was held in place. This was an awkward process and made even more so by the necessity to support the weight of the tool itself.

More recently, tools have been designed that incorporate a locking mechanism that locks the shaft/spindle relative to the tool housing. Thus, the rotation of the shaft can be prevented, simply by employing the built in shaft lock. For such a power tool, only one hand wrench is required to loosen or tighten the nut.

The need to use even one hand tool to change saw blades or grinding wheels, however, is still inconvenient. For example, when a blade replacement is required, the tool operator has to stop what he is doing to find a wrench, which may not be readily at hand.

SUMMARY OF THE INVENTION

It is, therefore, one object of the invention to provide a tool with a means for gripping that allows the user to conveniently install or remove a tool accessory disc, such as a circular saw blade, without the use of any hand tools.

It is another object of the invention to clamp the tool disc with a predetermined and reproducible amount of compression force and to thereby control the tool's slip torque.

It is still another object of the invention to provide adequate drive torque to the tool disc, for the given compression force, without nuisance slippage.

These and other objects of the invention are attained by a tool-free accessory clamping system employing a cam shaped clamp mechanism and/or a force multiplying clutch assembly.

The cam clamping mechanism has a head element that is threadably engageable with the saw's output spindle or shaft. The head element may take the form of a bolt that threads into an axial bore in the spindle or it may take the form of a nut that threads over an externally threaded end portion of the spindle.

Mounted by a pivot to the head element is a clamping element having a lever arm portion and a cam portion. The cam portion is in proximity to the pivot and has an irregular perimeter that is cam-shaped. The cam-shaped perimeter has a first portion of greater radius corresponding to the clamped position and a second portion of lesser radius corresponding to the unclamped position.

The lever arm portion of the clamping element extends approximately radially outward from the pivot and provides a graspable appendage for rotating the cam from the unclamped position to the clamped position. In order that the lever arm not project from the center of a spinning blade, the lever arm portion may be connected to the cam portion such that when in the clamped position the long axis of the lever arm is essentially planar parallel to the saw blade and when in the unclamped position the long axis of the lever arm projects at an angle from the plane of the saw blade.

The cam may act directly on the blade or a clamping washer may be interposed between the cam and the blade. Such a clamping washer may be coaxially and movably connected to the head of the blade clamp assembly. The clamping washer is located inwardly from the pivot pin and is engageable by the cam. When the clamping lever is rotated from the unclamped to the clamped position, the first portion of the cam shaped perimeter rolls into contact with the exterior face of the clamping washer and exerts an axially inward force against the clamping washer. Thus, the blade is clamped between the interior face of the clamping washer and the exterior face of the inner washer or end face of the spindle.

The clamping washer may be a Belleville spring washer or such a spring washer may be interposed between the clamping washer and the axially exterior blade face. Belleville spring washers have a slightly convex profile, as viewed from the outside and exhibit a characteristically flat force versus deflection profile as they are pressed flat. By selection of the particular Belleville washer employed the tool designer or operator can effectively and reproducibly set the compression force which the saw blade will experience.

In such an embodiment, as the clamping washer moves axially inward under the force exerted by the cam, the Belleville washer flattens and transmits the predetermined force onto the saw blade.

Due to practical limitations, such as the stack height of the mechanism, an operator can only exert limited compression force with the mechanical advantage conferred by small finger gripped components. Similarly, the radius of the clamping components is limited by the smaller elements of the drive train. Thus, the drive torque transmitted to the blade is limited according to the formula Torque=F×μ×r (where F=the clamping or compression force, μ=the coefficient of friction and r=the radius of the clamped components). When forces under load exceed this value, slippage between the clamped surfaces can occur.

Our work indicates that a common location for slippage to occur is at the contact surface between the inner washer and the inner race of the ball bearing, where the radius of the contacting parts is necessarily small. In order to increase the torque transmitted from the shaft to the blade while avoiding slippage, a force-multiplying clutch with multiple compression discs may be added to the blade clamping assembly described above. Alternatively, such a force-multiplying clutch may be employed with alternative clamping means; for example a simple finger tightened retaining nut.

A clutch assembly may include a plurality of alternating discs located near the axially outer end of the drive shaft. For example, a first group of discs may be stacked over the end of and keyed to the drive shaft or spindle, for example with a so-called "Double-D" shaped key cutout in their center. A second group of discs are also stacked over the end of the drive shaft alternating with the discs of the first group, but are not keyed to the shaft. The discs of the second group may have a slightly larger diameter than those of the first group and on their perimeter each is provided with a plurality of radially outward projecting splines.

Over the end of the drive shaft and over the alternating stack of discs is fitted an inner washer with an axial bore. The inner washer has an internal bore portion of increased diameter towards its axially inner end that has radially inward projecting splines. The inner splines of the inner washer interlock with the outer splines of the second group discs.

Thus, the rotating shaft directly turns the first group discs keyed to it at their center. The first group discs transmit drive torque to the second group discs by friction contact at their alternating faces. In turn, the second group of discs directly drives the inner washer through the interlocked splines. The inner washer transfers the torque to the rotary tool accessory. By this clutch assembly, the available torque can be multiplied in accordance with the formula—Torque=F×μ×n×r (where F=the clamping or compression force, μ=the coefficient of friction, n=the number of disc friction-surface pairs and r=the radius of the discs).

The axially outward facing head of the inner washer may serve as the contact surface for the interior face of the saw blade. The saw blade may be clamped to the inner washer as described above. The clamping force F will be transmitted through the alternating discs of the clutch assembly. Where the clutch assembly is employed the blade may be keyed to the inner washer with a diamond shape or the like, as previously mentioned. By providing such a positive torque-transmitting interface between the blade and inner washer, any slippage must occur at the multiple disc clutch surfaces.

Thus, the cam clamp mechanism and the clutch assembly may be employed separately or together to provide a means for holding a rotary tool accessory, such as a circular saw blade, without the need for hand tools. Where torque requirements are lower the cam clamp mechanism or the clutch assembly individually may be sufficient. Where the rotary torque requirements are higher, the compression force provided by the cam clamp mechanism may be combined with the force-multiplying clutch assembly.

BRIEF DESCRIPTION OF THE DRAWINGS

Additional objects and advantages of the present invention will become apparent from a reading of the following detailed description of the preferred embodiments that make reference to the drawings of which.

DETAILED DESCRIPTION

The present invention provides a wrenchless accessory retention system for rotary power tools employing rotating accessories such as circular saw blades and grinding wheels. While shown through the drawings in various embodiments of a portable circular saw, those skilled in the art will appreciate that the invention is not so limited in scope. In this regard, the teachings of the present invention will be understood to be readily adaptable for use in any tool presently incorporating a threaded bolt or nut and washer clamping arrangement for holding a rotating tool accessory (e.g. framing saw, grinder, etc.). Furthermore, although described throughout as a blade or disc, it is contemplated that the present invention is adaptable to any interchangeable tool accessory designed to rotate around a central hub.

Figure 1:
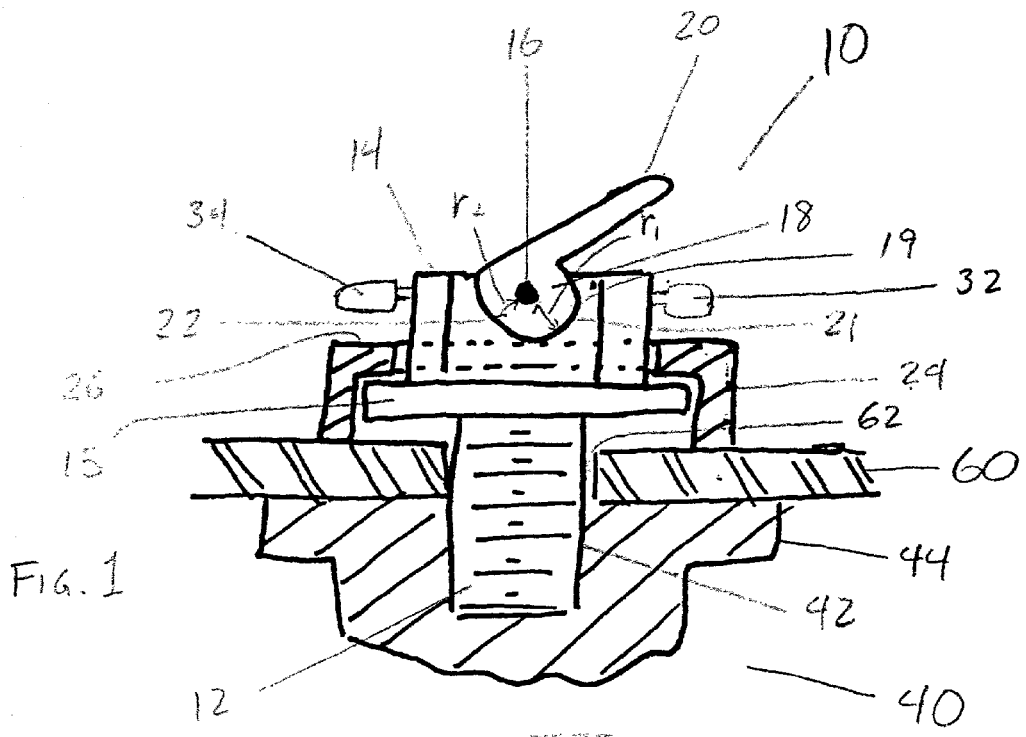
FIG. 1 is a cross-section view of a cam clamping mechanism according to the present invention.
Figure 2:
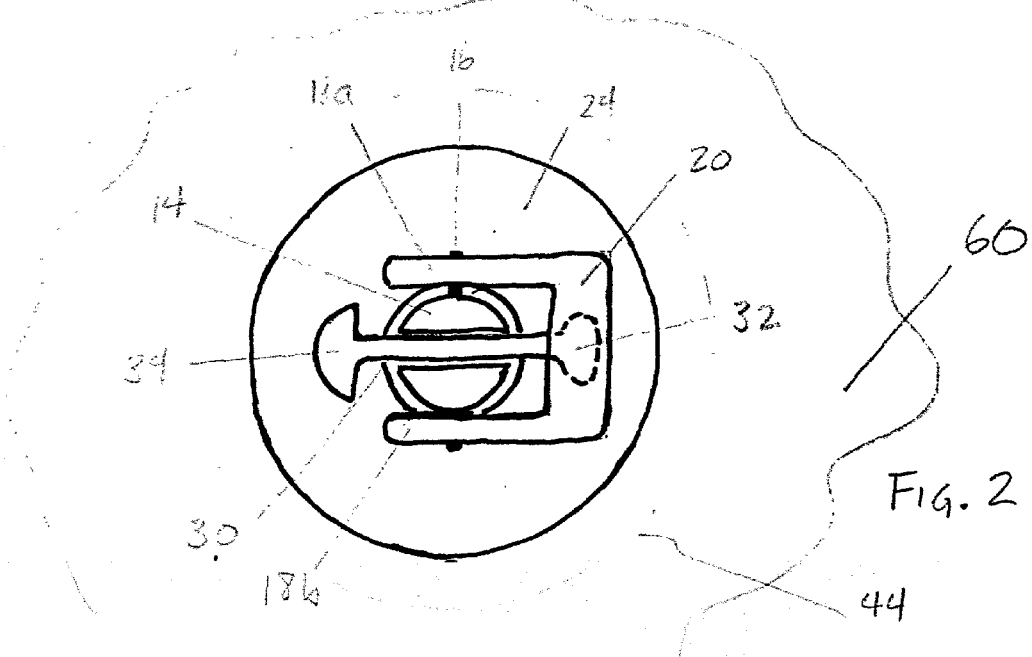
FIG. 2 is a top plan of the cam clamping mechanism of FIG. 1.
Figure 8:
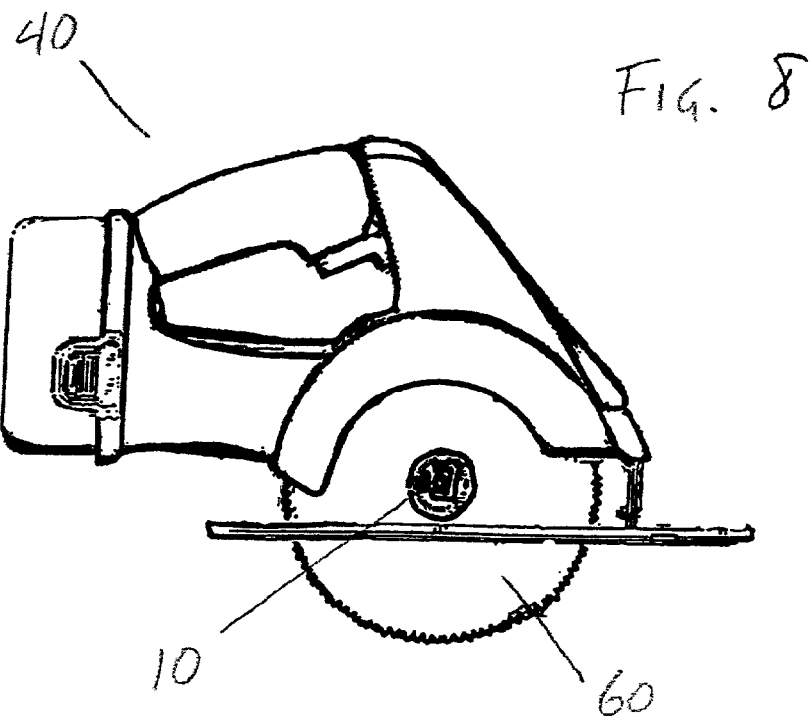
FIG. 8 is a side elevational schematic of a circular saw incorporating the present invention.
Figure 9:
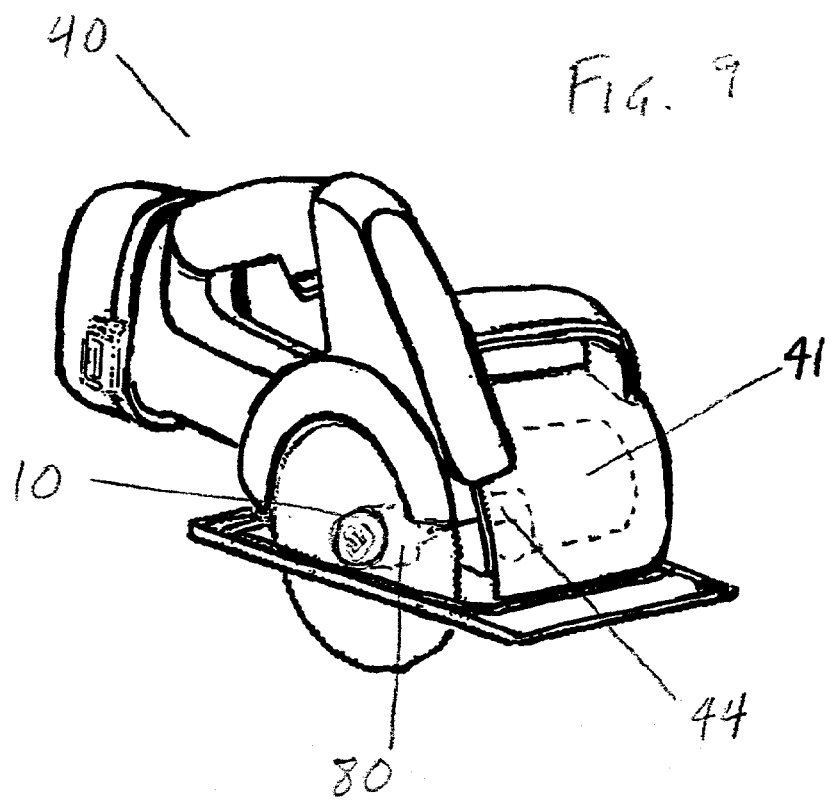
FIG. 9 is a perspective schematic view of a circular saw incorporating the present invention.

Turning generally to the drawings in which identical or equivalent elements have been denoted with like reference numerals, and particularly to FIGS. 1 and 2, a cam shaped clamping mechanism is illustrated and designated with the reference numeral 10. Clamping mechanism 10 cooperates with a rotary power tool, designated generally with the reference numeral 40, to clamp and hold a disc shaped power tool accessory, here a circular saw blade 60. FIGS. 8 and 9 depict the rotary power tool 40 as a circular saw tool having a motor 41 with a shaft 44 and incorporating the clamp mechanism 10 and the clutch assembly 80 (described below) of the present invention.

The particular clamp assembly shown is in the form of a bolt including a threaded shaft 12 and a head 14. Shaft 12 threads down into the bore 42 of the power tool output spindle or shaft 44. Head 14 is coaxial with the shaft 12 and projects perpendicular to the plane of the blade 60. Head 14 is pierced by a pivot pin 16 transverse to the axis of the shaft 12 and includes a flange portion 15 perpendicular to the plane of the blade 60 and axially below the pivot pin.

Pivotably mounted to the pivot pin 16 is a cam 18. The peripheral surface 19 of cam 18 has two portions. First portion 21 has a first radius $r_1$ and corresponds to the clamped position of cam 18. Second portion 22 has a second radius $r_2$, smaller than $r_1$, and corresponds to the unclamped position of cam 18. A cam lever 20 is connected to cam 18 and projects from it in a line transverse to the pivot pin 16. By means of cam lever 20, the operator may rotate cam 18 from the clamped to the unclamped position.

Arranged on the head 14 with limited axial mobility and arranged substantially planar parallel to the blade 60 is a cup-shaped clamp washer 24. Clamp washer 24 is captured between the cam 18, which can contact the axially outer surface 26 of the clamp washer 24, and flange 15 of the head 14.

As can be seen in FIG. 2, the cam may be in two parts 18a and 18b, on either side of the head 14. The cam lever 20 may be a U shaped piece connected to both cam parts 18a and 18b. The clamping mechanism may also include a cam release lever 30. Release lever 30 is pivotally connected to pivot pin 16 and has two end portions. First end portion 32 lies underneath cam lever 20 and second end portion 34 is located at the other extremity of release lever 30. Release lever 30 is bent approximately in the location where it connects to pivot pin 16, so that ends 32 and 34 do not lie in the same plane.

To install a saw blade 60 on a rotary tool 40, the blade is installed with a central opening 62 coaxial with the bore 42 of the output spindle 44. Shaft 12 is inserted through opening 62 and threaded into bore 42, until finger tight. Cam 18 should be in the unclamped position and clamp washer 24 is loosely retained between the cam 18 and head flange 15.

To clamp the saw blade, the operator presses down (axially inward) on cam lever 20. The movement of cam lever 20 causes cam 18 to rotate into the clamped position and moves first portion 21 of peripheral surface 19 into contact against the outer face 26 of the clamp washer 24. As cam 18 rotates it exerts an increasing compression force onto clamp washer 24, which in turn exerts increasing force onto blade 60. When cam lever 20 is substantially parallel to the plane of blade 60, cam 18 will be positioned so that first portion 21 with radius $r_1$ is exerting the maximum compressive force on blade 60.

Simultaneously, as cam lever 20 moves down it drives down first end portion 32 of cam release lever 30 and drives up second end portion 34.

To unlock blade 60, the operator may press down on second end portion 34 of cam release lever 30. The cam release lever 30 will pivot around pivot pin 16 and first end portion 32 will move up, thus pushing up against the underside of cam lever 20. As cam lever 20 rotates upward, it will rotate the cam 18. Peripheral surface 19 will rotate from first portion 21 to second portion 22 in contact with surface 26 of clamp washer 24, thus releasing the force exerted against the clamp washer. This arrangement eliminates the need for an operator to get a finger underneath cam lever 20, which might be difficult given the size of the components and clearances between them.

To complete removal of the saw blade 60, the operator unthreads the shaft 12 from the bore 42 with his fingers.

Figure 3:
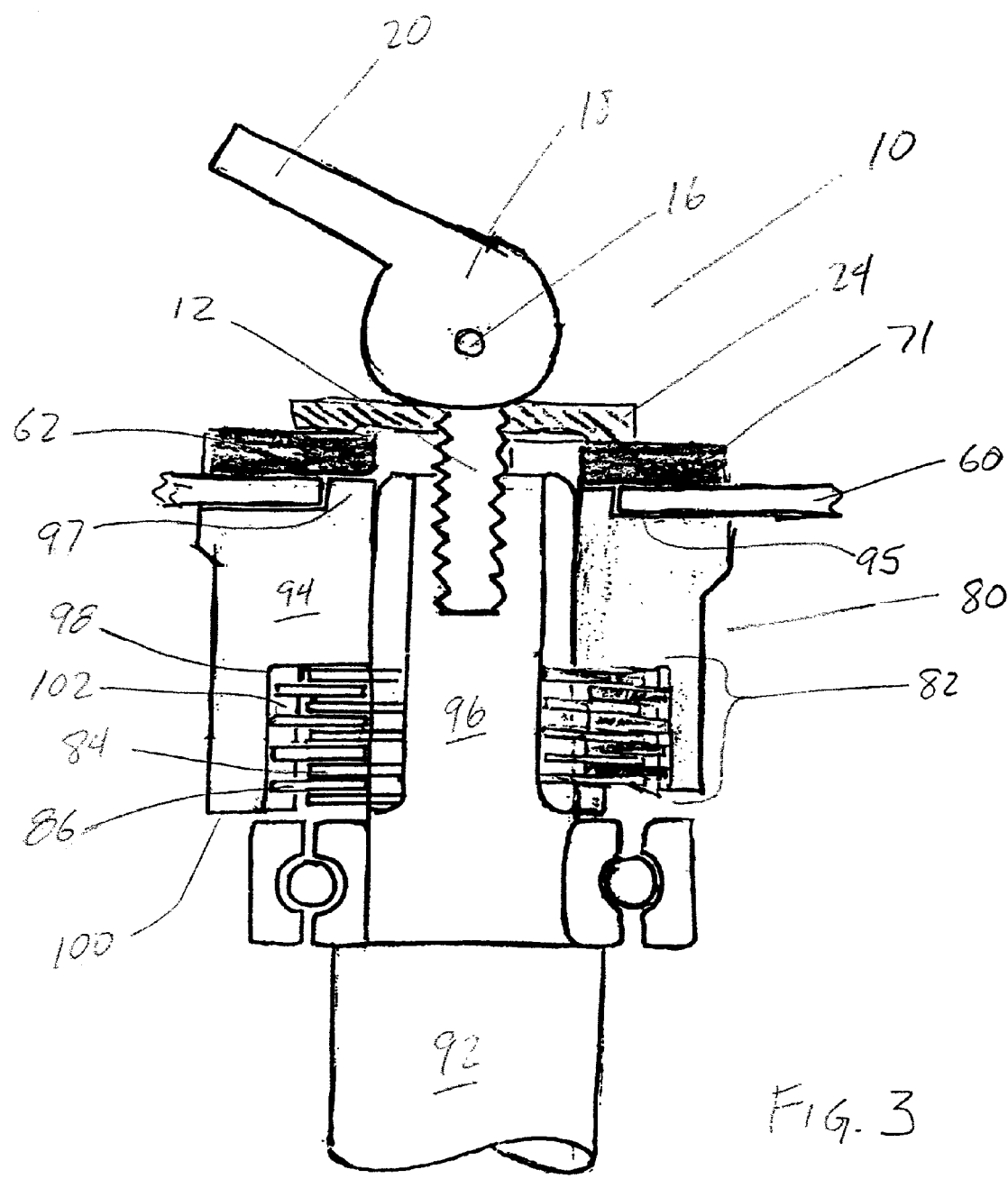
FIG. 3 is an elevational cross section view of the cam clamping mechanism of FIG. 1 further including a clutch assembly according to the present invention.

In order to increase and control the compression force exerted on the saw blade 60, and thus the torque that may be transmitted to the blade before slippage occurs in the drive train, elements depicted in FIG. 3 (from which some details of the clamping mechanism 10 have been omitted) may also be incorporated into the current invention. For example, a spring washer or, more specifically, a Belleville washer 71 may be inserted between the clamp washer 24 and the saw blade 60. The characteristically flat force versus deflection profile of a Belleville washer allows the tool designer to effectively and reproducibly set the compression force which the saw blade 60 will experience, relatively independent of the exact amount of rotation by the cam 18. Here, as the clamping washer 24 moves axially inward under the force exerted by the cam 18, the Belleville washer 71 flattens but the compression force transmitted through it onto the saw blade 60 remains relatively constant.

Also as depicted in FIG. 3, the present invention may incorporate a clutch assembly 80, which will transmit more torque to the blade 60 before the onset of slippage. In clutch assembly 80, a plurality of alternating stacked discs 82 transmit torque between the drive spindle 92 and an inner washer 94.

Figure 4:
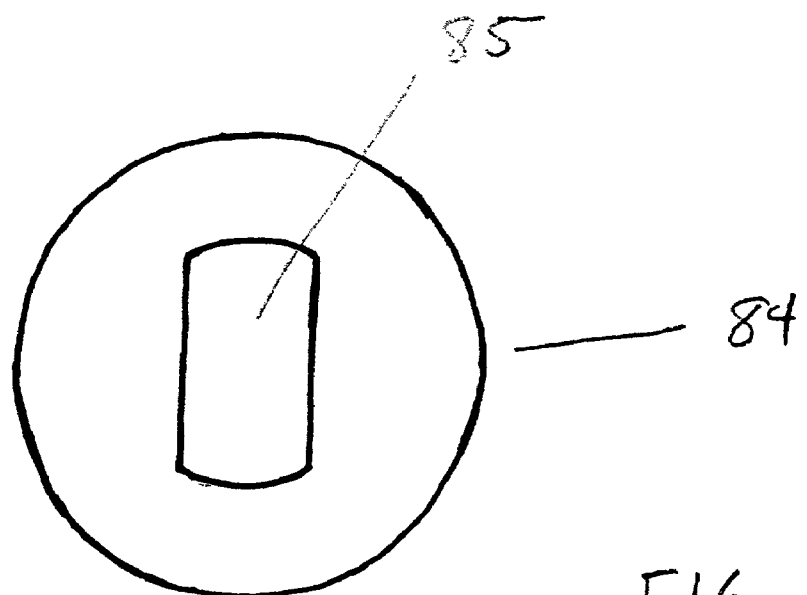
FIG. 4 is a top plan view of a representative first group disc of the clutch assembly of FIG. 3.
Figure 5:
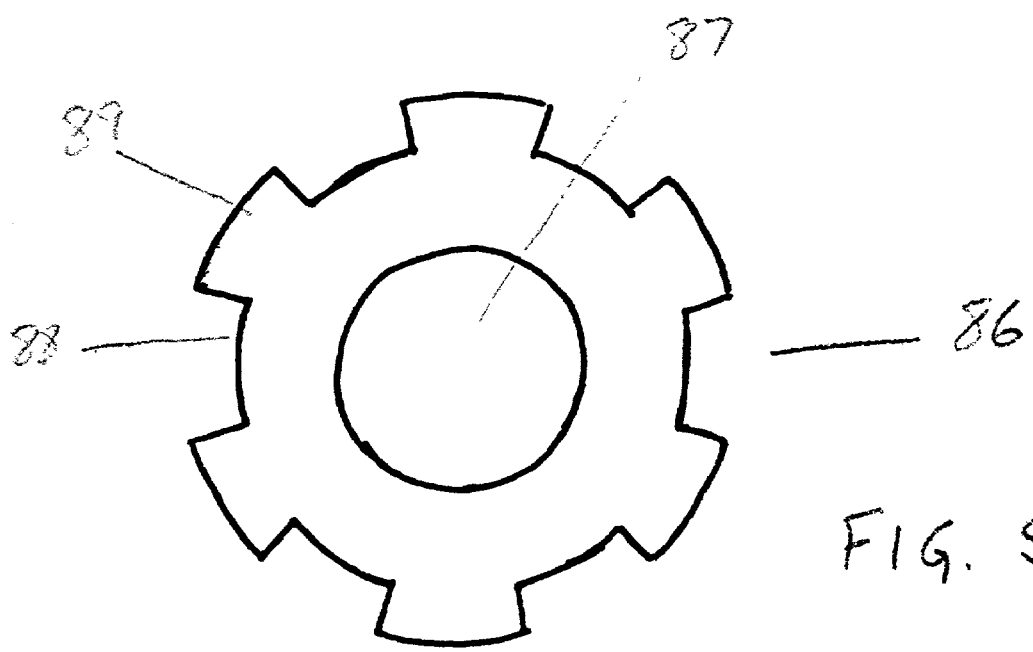
FIG. 5 is a top plan view of a representative second group disc of the clutch assembly of FIG. 3.

Referring now to FIGS. 4 and 5, the stacked discs 82 consists of at least one each of two types. The first type of disc 84 is a generally circular washer keyed to the axially outer end 96 of the spindle 92 at a central opening 85, here shown in the well known "double-D" shape. The second type of disc 86 is not keyed to the spindle end 96. Second type discs 86 have a central opening 87, here circular, that is freely rotatable around the spindle. The outer periphery 88 of the second type discs 86 has radially outward projecting splines 89 with a radius greater than that of the first type discs 84.

Figure 6:
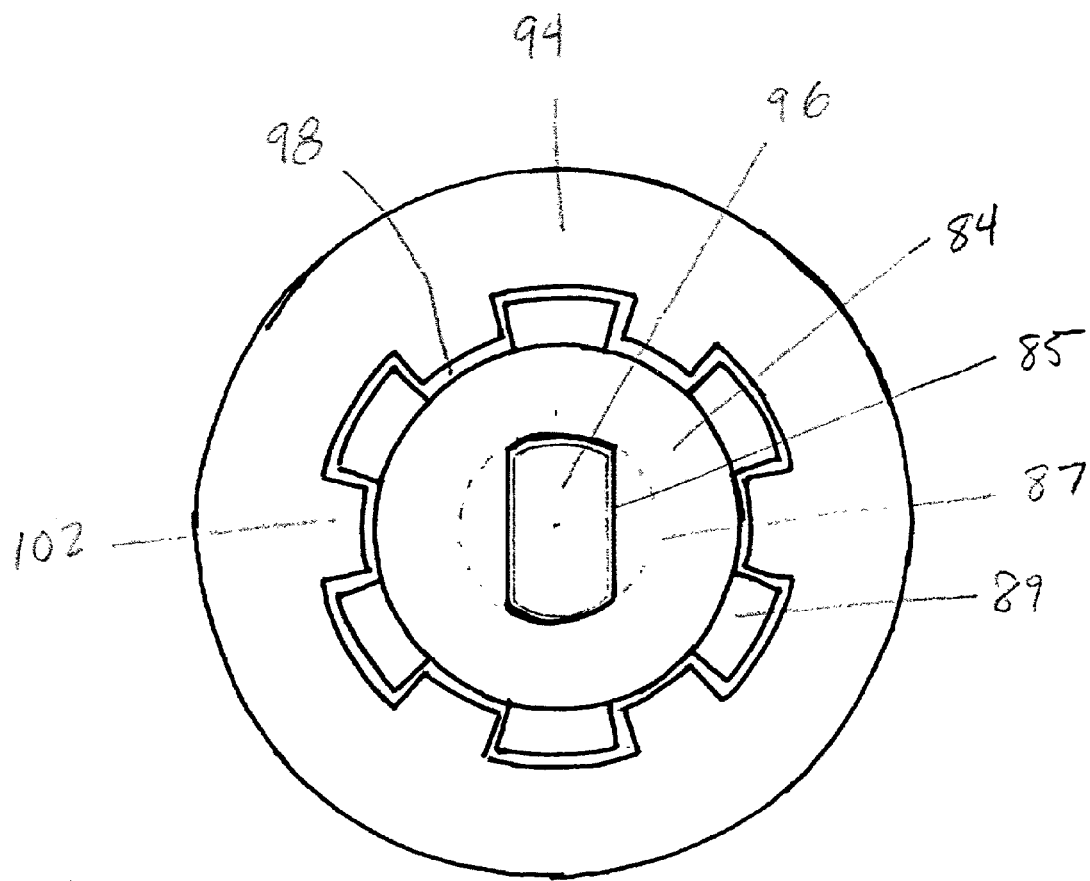
FIG. 6 is a cross section along line 6—6 of FIG. 3.

Referring now to FIGS. 3 and 6, the first type discs 84 and second type discs 86 are alternately stacked on the spindle 92. The axially outward end 96 of the spindle 92 has a shape that fits into the keyed opening 85 of the first type discs 84. The splines 89 of the second type discs 86 are aligned together.

Over the axially outer end 96 of the drive shaft 92 and over the alternating stack of discs 82 is fitted an inner washer 94. The inner washer 94 has an internal bore 98 on its axially inner end 100. The internal bore 98 has radially inward projecting splines 102. The inner splines 102 of the inner washer 94 interlock with the outer splines 89 of the second group discs 86.

Thus, the rotating shaft end 96 directly turns the first group discs 84 keyed to it at their center hole 85. The first group discs 84 transmit drive torque to the second group discs 86 by friction contact at their alternating faces. In turn, the second group discs 86 directly drive the inner washer 94 through their interlocked splines 89 and 102. The saw blade 60 is clamped to the axially outer face 95 of the inner washer 94, as previously described, and thus the drive torque is transmitted to it from the inner washer. By this clutch assembly, the available torque is multiplied in accordance with the formula—Torque=$F \times \mu \times n \times r$ (where F=the clamping or compression force, $\mu$=the coefficient of friction, n=the number of disc friction-surface pairs and r=the radius of the discs). With the advantage of force multiplication the operator manipulated component, be it a cam clamping mechanism 10 or a conventional nut, can be smaller and yet avoid the need for a tool to give added mechanical advantage.

In higher torque applications, in order to provide for direct torque transmission between the outer face 95 and the saw blade 60, a raised geometric shape 97 (for example a diamond, shown only in cross section) in outer face 95 may be keyed to a matching hole 62 in the saw blade 60. In such an arrangement, slippage must occur at the multiple disc clutch surfaces.

Figure 7:
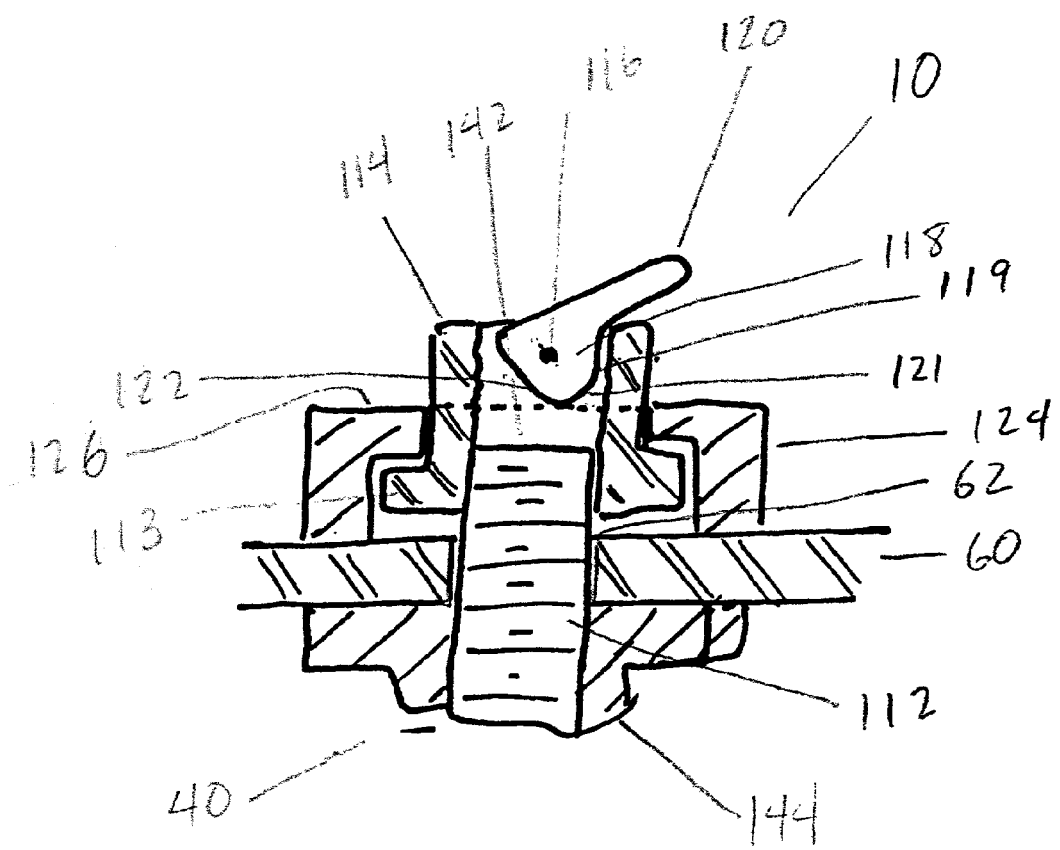
FIG. 7 is an elevational cross-section view of an alternative embodiment of a cam clamping mechanism according to the present invention.

Alternatively, as depicted in FIG. 7, the clamping assembly 10 may take the general form of a nut, instead of a bolt. In such an embodiment, head 114 has a threaded bore 142 and threads down over a threaded portion 112 of the power tool output spindle 144. Head 114 is coaxial with the threaded portion 112 and projects perpendicular to the plane of the blade 60. Head 114 is pierced by a pivot pin 116 transverse to the axis of the extension 112 and head 114.

Pivotably mounted to the pivot pin 116 is a cam 118. The peripheral surface 119 of cam 118 has two portions. First portion 121 has a first radius $r_1$, and corresponds to the clamped position of cam 18. Second portion 122 has a second radius $r_2$, smaller than $r_1$, and corresponds to the unclamped position of cam 118. A cam lever 120 is connected to cam 118 and projects from it in a line transverse to the pivot pin 116. By means of cam lever 120, the operator may rotate cam 118 from the unclamped to the clamped position.

Connected to the head 114 with limited axial mobility and arranged substantially planar parallel to the blade 60 is a clamp washer 124. Clamp washer 124 is captured between the cam 118, which can contact the axially outer surface 126 of the clamp washer 124, and the saw blade 60.

In the FIG. 7 embodiment, to install a saw blade 60 on a rotary tool 40, the blade is installed with a central opening 62 coaxial over the shaft extension 112. Head 114 is then threaded onto shaft extension 112, till finger tight. Cam 118 should be in the unclamped position and clamp washer 124 is loosely retained between the cam 118 and head flange 113.

To clamp the saw blade 60, the operator presses down on cam lever 120. The movement of cam lever 120 causes cam 118 to rotate into the clamped position and moves portion 121 of peripheral surface 119 into contact against the outer face 126 of the clamp washer 124. As cam 118 rotates it exerts an increasing force onto clamp washer 124, which in turn exerts increasing force onto blade 60. When cam lever 120 is substantially parallel to the plane of blade 60, cam 118 will be positioned so that first portion 121 with diameter $d_1$ is exerting the maximum compressive force on blade 60.

Simultaneously, as cam lever 120 moves down it drives down first end portion 132 of cam release lever 130 and second end portion 134 up.

To unlock blade 60, the operator may press down on end portion 134 of cam release lever 130. The cam release lever 130 will pivot around pivot pin 116 and first end portion 132 will move up, thus pushing up against the underside of cam lever 120. As cam lever 120 rotates upward, it will rotate the cam 118. Peripheral surface 119 will rotate from first portion 121 to second portion 122 in contact with surface 126 of clamp washer 124, thus releasing the force exerted against the clamp washer.

To complete removal of the saw blade 60, the operator unthreads the head 114 from the shaft extension 112 with his fingers.

While the above description constitutes three preferred embodiments of the invention, it will be appreciated that the invention is susceptible to modification, variation, and change without departing from the proper scope or fair meaning of the accompanying claims. In particular and as discussed above, the cam clamping mechanism and clutch assembly may be used individually or together depending on the torque requirements of the particular tool.

What is claimed is:

1. A system for clamping an accessory disc to an output shaft of a rotary tool comprising a cam clamping mechanism and a clutch assembly wherein the cam clamping mechanism comprises:

a head element threadably engageable with the output shaft at a location axially outward of the accessory disc;

a cam rotatably connected to the head element and rotatable between a clamped and unclamped position, wherein the clamped position the cam exerts a compression force axially inward against the accessory disc; and wherein the clutch assembly comprises:

at least one first type of disc located coaxially on and keyed to the output shaft;

at least one second type of disc located coaxially on the output shaft and in planar parallel contact with the first type disc; and an inner washer having an internal bore, the inner washer located coaxially on the output shaft, axially outward of and surrounding the first type disc and the second type disc, the inner washer keyed at the internal bore to the second type of disc such that rotation of the second type of disc imparts rotation to the inner washer.

2. A system for holding an accessory disc to an output shaft of a rotary tool comprising a cam clamping mechanism and a clutch assembly wherein the cam clamping mechanism comprises:

a head element threadably engageable with the output shaft;

a cam rotatably connected to the head element and rotatable between a clamped position and an unclamped position, wherein the clamped position the cam exerts a compression force axially inward.; and wherein the clutch assembly comprises:

a washer defining an internal bore and located coaxially on the output shaft;

at least one first type of disc located coaxially on and keyed to the output shaft; and at least one second type of disc located coaxially on the output shaft and in planar parallel contact with the first type of disc and the second type of disc is inside the bore of the washer and keyed to the washer.

3. A rotary tool, comprising:

a motor;

an output spindle rotatably driven by the motor a rotary tool accessory;

a cam clamping mechanism for connecting the rotary tool accessory to the output spindle, the cam clamping mechanism including a head element threadably engageable wit the output spindle;

a cam rotatably connected to the head element and rotatable between a clamped position and an unclamped position, wherein in the clamped position the cam exerts a compression force upon the rotary tool accessory; and a clutch assembly for rotating the tool accessory on the output spindle, wherein the output spindle has an axis and the clutch assembly includes:

a washer defining an internal bore, the washer located coaxially on the output spindle and in engagement with the accessory disc;

at least one first type of disc located coaxially on and keyed to the output spindle; and at least one second type of disc located coaxially on the output spindle and in planar parallel contact with the first type of disc and the second type of disc is inside the bore of the washer and keyed to the washer.

* * * * *